United States Patent

Blyt

[11] Patent Number: 5,948,198
[45] Date of Patent: *Sep. 7, 1999

[54] METHOD OF PRODUCING A CORRUGATED CONSTRUCTION UNIT

[76] Inventor: Christian Frode Blyt, 710 W. 16th Ave., Vancouver, British Columbia, Canada, V5Z 1S7

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,577

[22] Filed: Sep. 30, 1996

[51] Int. Cl.$^6$ .............................. B27D 1/08; B32B 31/18; B32B 31/20

[52] U.S. Cl. ...................... 156/206; 144/346; 156/205; 156/222; 156/264

[58] Field of Search ..................................... 156/205, 206, 156/208, 264, 265, 222, 221; 52/783.14, 783.15, 783.17; 144/349, 346; 428/179

[56] References Cited

U.S. PATENT DOCUMENTS

| | | | |
|---|---|---|---|
| 2,312,332 | 3/1943 | Gramelspacher | 156/222 |
| 3,003,204 | 10/1961 | Bryant | 156/206 |
| 4,428,993 | 1/1984 | Kohn et al. | |
| 4,816,103 | 3/1989 | Ernest | |

FOREIGN PATENT DOCUMENTS

| | | |
|---|---|---|
| 128546 | 7/1991 | Canada . |
| 1260904 | 1/1961 | France . |
| 1360105 | 7/1974 | United Kingdom . |

Primary Examiner—Richard Crispino
Attorney, Agent, or Firm—Todd N. Hathaway

[57] ABSTRACT

The present invention relates to a corrugated component (10) of wood-like material. The component consists of at least three layers of wooden material sheets (1,2) which are joined together with the aid of a bonding agent. At least one (1) of said layers has it grains running at an angle to the other layers (2). The undulations (9) are created before the bonding agent hardens in order to permit the layers of the wood-like material to move relatively to each other in order to compensate for the differing bending radii of the individual layers.

12 Claims, 5 Drawing Sheets

METHOD OF PRODUCING A CORRUGATED CONSTRUCTION UNIT

This application claims the benefit of International Application PCT/FI95/00187, filed on 5 Apr. 1995.

FIELD OF THE INVENTION

The present invention relates to a component or construction unit made of wood-like material, said component having a board-like structure and being formed from several layers of wooden material by bonding said layers together. More precisely, the present invention relates to a construction unit formed as, for example, plywood board and having corrugations extending in a first direction, said layers of the wood-like material being arranged such that at least one of the layers is having the grains thereof running in second direction relative to said first direction and said construction unit being bonded after the forming of the corrugations.

The present invention also relates to a method for the manufacture of a component made of wood-like sheets or webs, in which several layers of wood-like sheets or webs are bonded together. More precisely, the present invention relates to a method, by which the component is provided with rigid undulated form and thereafter bonded.

BACKGROUND

Wooden components are, for example, constructed as plywood boards. In plywood boards, a number of thin wooden layers are glued and pressed together. The plywood boards have a relatively high strength to low weight ratio and can be easily processed, like cut or drilled. Another well-known board-like component is constructed as a so-called coreboard. Such coreboards have solid wood profiles which are glued together inside and which are covered by plywood boards on the outside. Such coreboards are generally used to construct solid furniture components or panelling for buildings.

However, the well-known components made of wood and having generally flat shape and grains extending in one direction cannot meet all application requirements of high stability, low weight and high flexibility as well as requirements in savings of wood-like material and labor, when using them for instance in construction work.

Proposals has been made to improve the properties of the components made of wood, like plywood. For instance, a method of making a corrugated vegetable-fiber board from material which have sufficient plasticity when wet and becoming rigid upon being dried out is disclosed in U.S. Pat. No. 2,058,334 (Mason). In this prior art method the sheet having a thickness of about 3.2 mm is treated by several wetting, oiling, heating, drying and pressing stages. The method, however, includes the disadvantages in that the corrugation process of one single sheet is time consuming, requiring at least one day to produce and in most cases the producing time is even longer. Several heating stages at relatively high temperatures are required, which increases the need of energy and thus further the costs. Furthermore, since the corrugated panel is made from one flat panel by the above mentioned treatments, the corrugations are slightly retaining in use and especially under severe conditions of alternative wetting and drying out. A further disadvantage is that the resulting corrugated sheet is not thick enough to meet the requirements of wide variety of applications. Furthermore, the stiffness of the panels in direction perpendicular to the corrugations has also been found insufficient.

GB Patent Application 2 087 793 discloses a corrugated building panel and method of manufacturing the same, said panel being formed of two plies of flexible paperboard or chipboard by steaming the two plies, applying an adhesive to facing side of one of the plies, corrugating the plies and thereafter immediately bonding the plies together. However, the method disclosed is capable to handle only sheets in the range of 0.9 to 1.3 mm in thickness and is merely related to paperboard sheets and not to sheets of wood-like fibrous material, like veneer. Furthermore, this proposal does not relate to the problem of stiffness of the produced panel or to the problem caused by the humid conditions, in which the panel might be used.

In GB Patent 1 360 105 a plywood construction is disclosed, in which plywood comprises a plurality of superposed interfitting corrugated veneers having their surfaces bonded together such that the grains of each veneer are crossing the ridges of the corrugations at an substantial angle to the ridges, the angle being always between 30 to 60° and preferably 45°. The method includes heat treatments of veneers with good bending properties in a steam filled atmosphere. Even though this solution has been able to give more rigid construction, there is a great loss of material when making corrugated plywoods, since the corners of the veneer sheets, which are substantially greater than the resulting corrugated panel, have to be cut off to achieve a corrugated panel having a square shape and corrugations extending from one edge to another. It is strongly pointed out in said GB Patent that if the angle of the grains is too great, i.e. over 60°, the veneers will splinter. An further disadvantage of that is that the appearance of the panel has nor fulfilled the aesthetic requirements due to the grains extending diagonally relative to the corrugations.

The object of the present invention is to overcome the disadvantages of the prior art proposals and to provide a new solution for a corrugated construction element and manufacture thereof, said element being sufficiently rigid for various applications and having good surface properties, but still being easy, quick and economical to manufacture and to process.

An another object of the invention is to provide a corrugated element comprising several and at least three layers of wood like sheets bonded to each other, said arrangements being such that at least one of the layers is arranged to be substantially perpendicularly placed relative to the corrugations.

A still another object is that the layers are arranged such that grains of one wood sheet are essentially perpendicularly placed relative to adjacent sheets.

A further object of the invention is to provide a corrugated panel of wooden sheets having an undulation of essentially small size.

A further object of the invention is to provide a corrugated construction element of wooden material, which keeps its shape as formed i.e. retains the shape of corrugations unchanged in use.

A still further object of the present invention is to provide a corrugated component and a method for producing such a component such that the shape, size and spacing of the corrugations and the thickness of the layers of the element can be adjusted such that any desired form of undulations or corrugations can be provided.

An additional object of the present invention is to provide a method for continuous producing of the elements according to the invention.

A further objective of this invention is to arrange the method in such a way that the component can be given an aesthetically attractive exterior design.

A still further object is to provide a method by which the use of the prior art wetting or steaming of the boards is avoided.

SUMMARY OF THE INVENTION

The present invention is based on the fact that the inventor has surprisingly found that, against all that what is taught by the prior art, a laminated corrugated construction element according to the invention can be produced by the inventive method and by the inventive apparatus by arranging the layers of the wooden multiply board such that at least one layer is preferably extending in angled direction relative to the ridges of corrugations and the element is provided with an essentially small undulation, i.e. radius preferably being less than 5 cm, and by bonding said corrugated layers to each other only after said corrugating stage is completed in order to permit said layers to move relatively to each other in order to compensate for the differing bending radii of the individual layers, a significant increase in the stiffness and rigidity of the resulting construction element is achieved without any risk of splitting or cracking of the wooden layers.

According to one preferred embodiment of the present invention the corrugated construction element comprises alternate layers of wood-like material such that the grains of adjacent layers are extending at angle of 70° to 120° to each other and preferably in essentially perpendicular directions, i.e. about 90° to each other and such that the grains of at least one of the layers are extending across the corrugations or undulations while the external layers are preferably extending parallel to the corrugations. This enhances the rigidity of the element and also helps to avoid uneven changes in shape caused by humidity.

The undulation of the corrugations is preferably formed by suitable pressing or moulding means. Said layers or plies are rigidly bonded together over as wide area as possible after the forming of the undulation has reached the desired depth and shape, but preferably prior the moulding elements are removed.

It is preferred to bond the layers by using suitable adhesive applied over at least one of the facing surfaces. However, depending on the respective requirements of the intended application, it is also possible to stick, rivet or nail together the wooden layers or to use any other suitable bonding means.

According to one embodiment the undulations have an essentially sinusoidal contour, which creates especially favourable profiles. According to an another embodiment the construction element has square formed undulation, even such that the corner or the corners of the undulation are essentially sharp. It is also possible to have the shapes between the sinusoidal and sharp edged shapes and/or a combination of essentially round and essentially sharp edged shapes.

According to one embodiment the construction element can be used as a standard component or a modular unit in various applications, for instance in furniture applications, like in shelves or cabinets, by creating a standard for the sizes and distances between the undulations and/or the heights of the undulations.

The moulding process can be carried out simply if the undulations are created by suitable moulding means provided in a corrugating or pressing apparatus. In some cases it is possible to achieve higher deformation forces if the undulations are created by a roller-shaped moulding element. With some particular contours in the undulation moulding, it is proposed that the undulations should be created by a board-like moulding element constructed with a moulding contour.

According to one embodiment the arrangement is provided with flexible backing sheet means which are placed between the moulding means and the pile of wooden sheets prior to the corrugating process.

According to one other embodiment the moulding means are provided with heating means or alternatively the flexible sheet means are provided with heating means. According one further embodiment the whole moulding area is isolated such that the surroundings of the element under processing can be heated.

According to one embodiment of the invention the process is realized as follows: a bonding agent is applied to at least on face of two adjacent layers, force is applied to create an undulating profile and during the application of force a relative movement of the wood layers to each other takes place to compensate for the differing bending radii of the individual wooden layers and finally the bonding agent hardens and thus the adjacent layers are bonded to each other in positions they are pressed by said force applied to the pile or stack of sheets.

In most cases it is believed to be essential that the whole surface area of the pile of the wooden layers is not subjected to the moulding force simultaneously. According to a preferred embodiment the moulding is performed such that the undulations are formed in sequence one by one and the moulding process is preferably initiated from the middle of the pile of sheets and proceeded outwardly towards the sides thereof. However, the pressing can also be initiated from one edge of said pile.

According to one other embodiment the production of corrugated wooden elements according to the invention can be arranged to be a continuous process and preferably such that the wooden sheets forming the layers are supplied from at least one web roll containing suitable sheet material.

Significant advantages are obtained by the present invention. The constructing element according to the present invention is easy to manufacture and to process and thus provides low total costs in various applications. Said element, however, provides an extremely rigid component having also a very attractive external design and being substantially light to handle, thus being capable to be used in a wide range of applications. For example, it is possible to construct wall or ceiling panelling in buildings with the component or to use it as base material for furniture. In addition, it is also possible, in various combinations with flat-surfaced boards, to provide highly stable solid board-like components of desired thickness having an extremely low weight as a result of the enclosed volume of air, but which are still very rigid and stable. Optionally, flat or undulating wooden profiles can be used on the outside, so that geometries can be provided that are adapted to the respective application.

In the following the present invention and the other objects and advantages thereof will be described by way of an example with reference to the annexed drawings, in which similar reference characters throughout the various figures refer to similar features. It should be understood that the following description of an example of the invention is not meant to restrict the invention to the specific forms presented in this connection but rather the present invention is meant to cover all modifications, similarities and alternatives which are included in the spirit and scope of the present invention, as defined by the appended claims. For example, it is apparent to the skilled man that one or several of the layers can be replaced by some other material, like sheet of aluminium or plastics.

DETAILED DESCRIPTION

Figure 1:
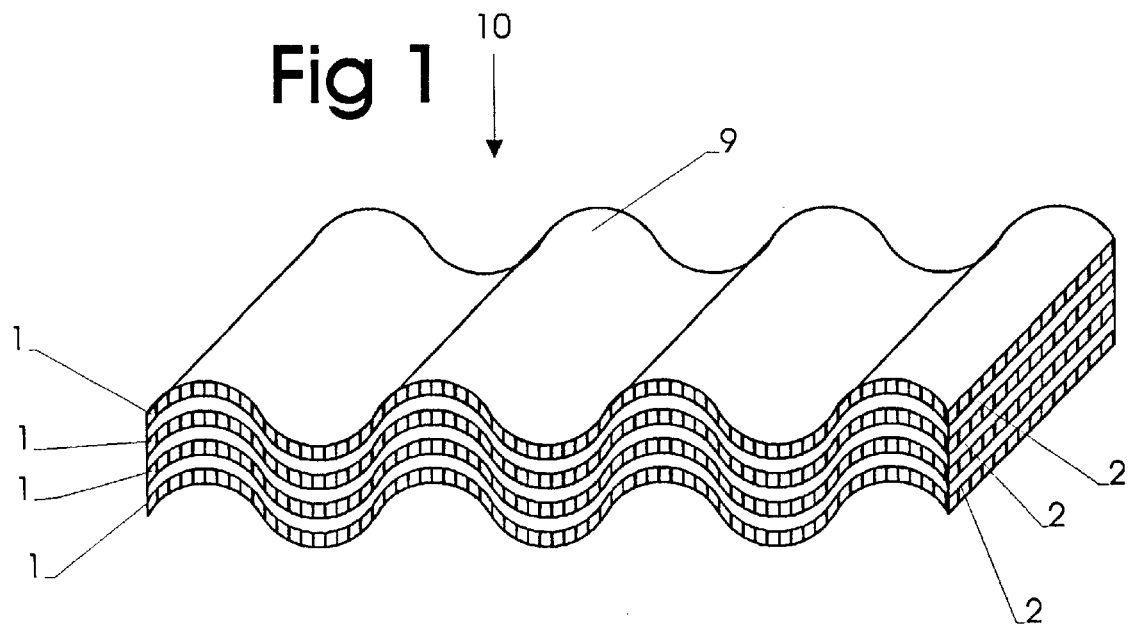
FIG. 1 is a perspective view of a wooden component according to the present invention.

In the embodiment shown in FIG. 1, the wooden component 10 or plywood comprises several wood layers 1 and 2 which are joined together over a wide area. In the direction of one spatial dimension, the wood layers 1 and 2 have an undulating profile 9. In this particular embodiment it is intended to give the undulating structure an approximately sinusoidal course, but different types of undulations can be provided as well, for instance an undulation having square-like shape and essentially sharp edges at the bottom and top of the undulation. The layers in the piece of plywood 10 are placed one above each other such that grains of the wood are extending substantially normal to each other, i.e. at an angle to each other which is between 70° to 120° and preferably about 90° and also such that the grains of external layers are substantially parallel with the undulations 9.

Figure 2:
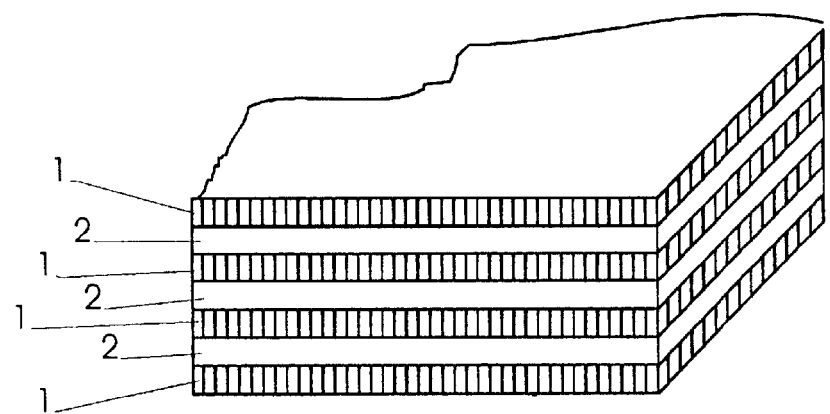
FIG. 2 is an enlarged perspective view of cross-section of a corner of multiply component comprising seven layers.

FIG. 2 shows a cross-section through a corner of the component constructed from seven wood layers 1 and 2. In particular, it is intended that the wood layers 1 and 2 adjoining one another will have grains running in perpendicular or opposite directions such that at least some of the grains are perpendicular to the ridges of corrugations. This means, firstly, that the mechanical rigidity is highly increased and, secondly, that the component is relatively insensitive to the absorption of humidity. Generally, in the case of wood components the problem arises that warping is noticeable when humidity is absorbed. The warping is attributable to the fact that the wood fibres absorb humidity and swell as a result. Since all the wood fibres in a piece of wood generally run in the same direction, there is an uneven change in the contour in one spatial dimension. The crosswise arrangement of the grain layers 1 and 2 leads to changes in volume in two spatial dimensions if humidity is absorbed. As a result, a warping of the component can be avoided.

Even though it is preferred to have uneven number of layers or plies such that the external plies are having the same direction of grains (or at angle of 180°), in some cases it is advantageous to have even number of plies and such that the outermost plies are perpendicular to each other. The intermediate layers can also be placed such that two or more intermediate layers on top of another of the pile are having their grains extending in same direction.

Figure 3:
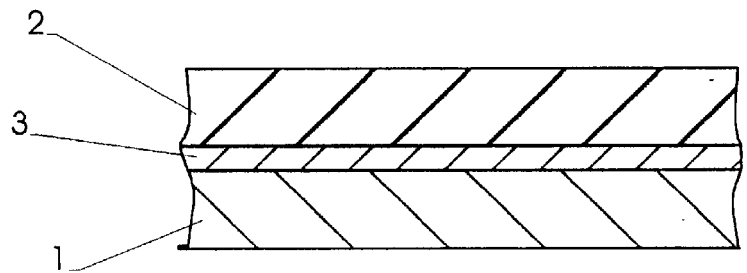
FIG. 3 is an enlarged partial cross-section in the area of two wooden layers joined together by a bonding agent.

FIG. 3 shows in section two wood layers 1 and 2 combined together and joined by a bonding agent 3. The bonding agent 3 can, for example, be wood glue or other suitable adhesive. Irrespective of the chemical composition of the bonding agent, it is important that the wood layers should be bonded over as wide an area as possible and that the adhesive forms as rigid adhesive ply as possible, with good finished strength and stability. An example of preferred adhesives are so called catalyst-type adhesives or two-component glues. Other suitable bonding agents are thermosetting glues or adhesives, thermosetting resins and similar adhesive materials.

Other possibility in bounding of the plies is to use mechanical fixing, for instance rivets, screws, nails, stitching or the like.

Figure 4:
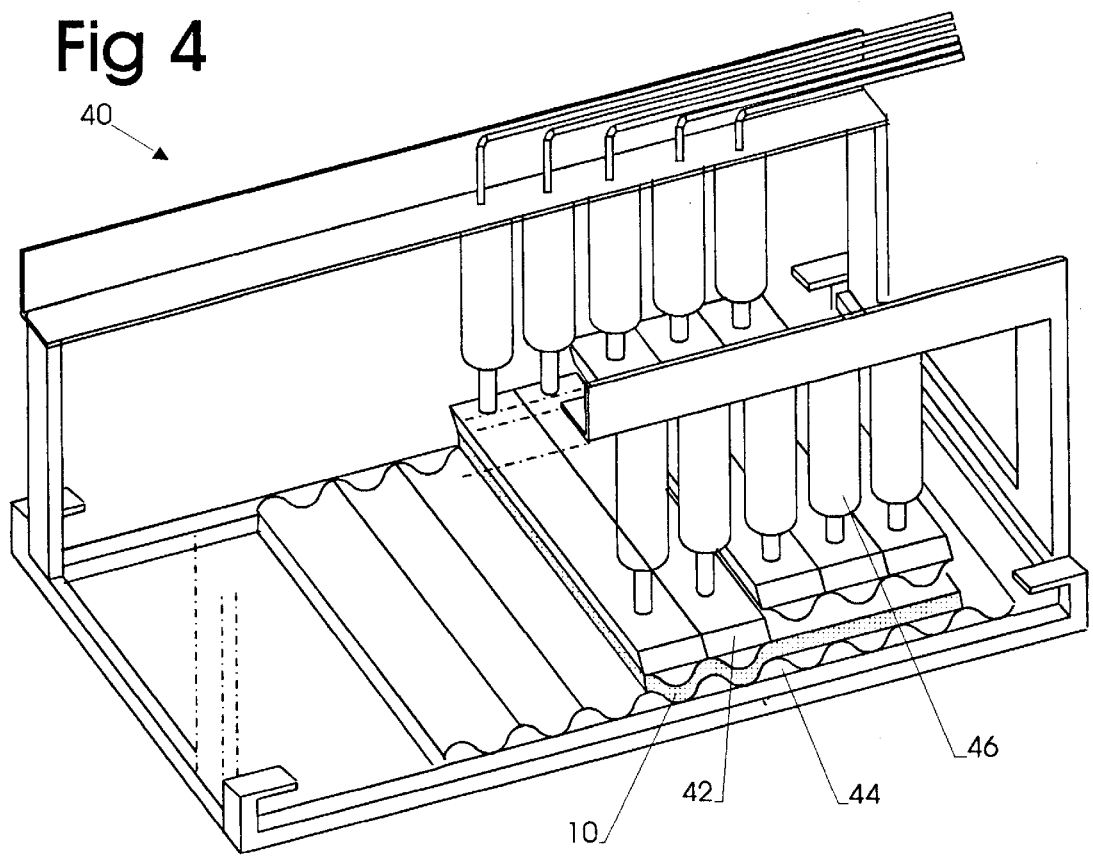
FIG. 4 is a highly simplified presentation of an arrangement according to the present invention.

FIG. 4 shows a schematic, perspective view of an apparatus 40 for the production of the undulating component. Moulding means 42 and 44 are positioned above and below the wood structure 10. These can be constructed with various shapes and sizes, and as an alternative to the shown they can be of round rods or tubes or the like. The upper moulding means 42 are actuated by cylinder means 46, which are preferably arranged such that the moulding means can be actuated in sequence one by one. In an alternative embodiment the counterpart 44 can also be arranged to have actuating means.

It is possible to join the moulding means positioned underneath and above the wooden component 10 with braces. The braces arranged on one side of the wood layers can, for example, be joined rigidly to a fixed bearing. The other braces can be joined to a positioning device which is constructed as a lifting device. As stated above, it is intended to use hydraulic pistons as a positioning and actuating device. However, for simple facilities, simple lifting rods, like screws, are also generally sufficient.

According to one embodiment the apparatus 40 is also provided with suitable flexible backing sheet means (see FIG. 9) during the corrugation process, said means being placed between the moulding means 42 and the external ply of the element 10 and in some cases in both sides of the pile 10 of wooden sheets. Said sheet means can be of any suitable material, a polymer plastic material being mentioned herein as an example. Said backing sheet is provided to minimize the friction between the moulding means 42, 44 and the external sheet and also to distribute the force more evenly to the surface of the sheet.

It is also to provide the apparatus with means, which are arranged to keep said backing sheet under constant tension, whereby any tendency of the wooden sheets to split or crack is further eliminated. The moulds can be provided with suitable pinch rollers or spring-type rollers, by which the planar elastic support element or backing sheet is held in constant tension in order to supply constant backing support to the pressed material. Said rollers can also be disposed on either side of said supporting element.

Figure 9:
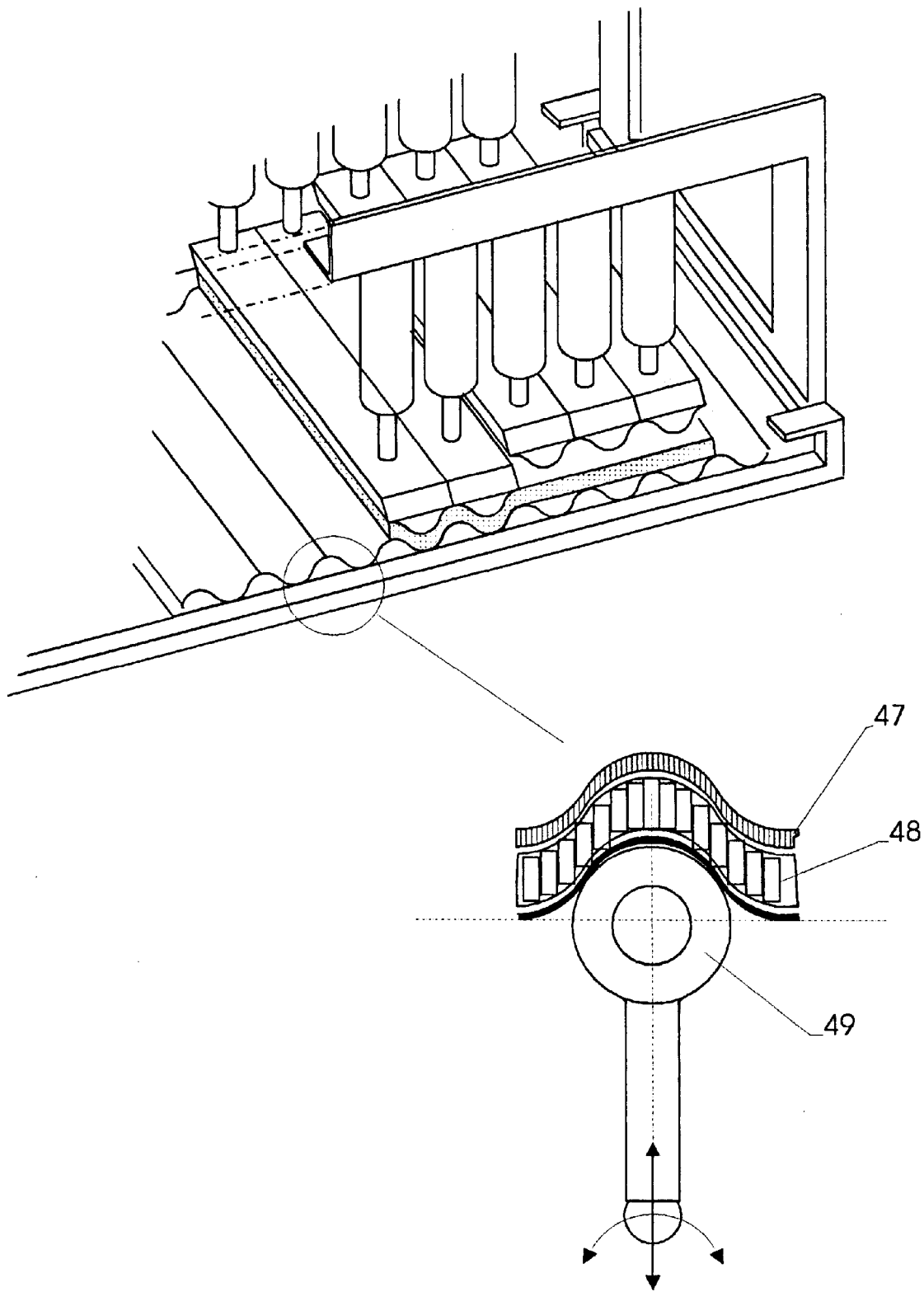
FIG. 9 shows a detail of the apparatus of FIG. 4.

According to one further embodiment the mould are adjustable such that the shape and/or dimensions of the moulds and thus the shape and/or dimensions of the resulting undulations can be varied. One such arrangement is shown in FIG. 9, in which a plurality of rigid elements 48 are provided below a flexible backing sheet 47. Said elements are actuated by actuating means 49 as indicated by the arrows. In an alternative embodiment this is arranged by splitting the mould in separate parts which can be moved or adjusted relative to each other by hydraulically or pneumatically actuated means, which are preferably operationally connected to a computer controlling the operation of the apparatus 40. According to one other embodiment the size and/or shape of the moulds can be varied by replacing the tops or crowns of the moulds.

The shape and the material of the moulds is not restricted to those shown. They can be, for instance, be manufactured from tubes, rods or any other suitable means for pressing and moulding desired shape to the pile of layers.

It is also preferably to provide the apparatus 40 with heating means (not shown) such that the hardening of the adhesive can be enhanced, the arrangement being also advantageous in reducing the moisture content of the plies 10. Heating means can be placed in connection with the moulding means 42 and 44, and in such case the moulding means can be heated by means of steam, hot oil or water, electricity or the like. A more uniform heating is achieved by isolating the whole pressing area or atmosphere around the pile of sheets and to provide an increased temperature to said surroundings. According to one further embodiment a high-frequency technology is used to bound the plies one to another, the adhesive being hardened by high-frequence waves, which are applied to the component during the curing cycle. In this case the flexible backing sheets of conductive material, for example, can be used as conductors, the other of said sheets being connected to +current and the other to −current, whereby a suitable current is conducted through the pile 10 thereby heating the adhesive and the plies.

The apparatus 40 can also be provided with means to inject or spray water to the plies of wood. There are also various alternative means for applying suitable adhesive to the facing surfaces of the sheets. These all means are well known and thus not explained any further.

Figure 5A:
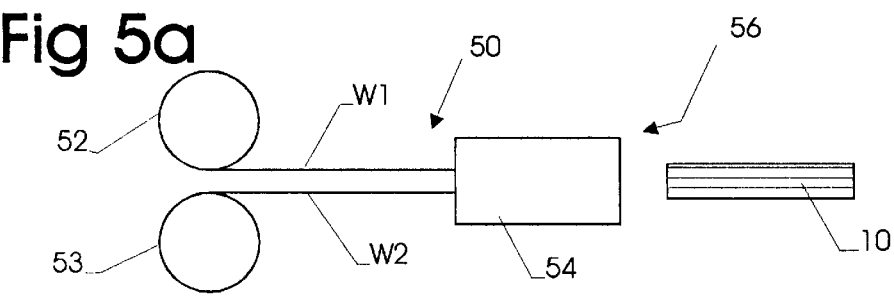
FIGS. 5a and 5b are schematic presentations of an alternative arrangement according to the present invention.
Figure 5B:
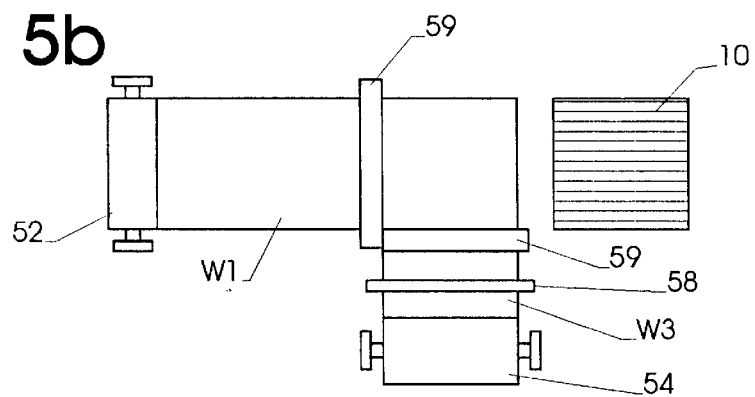

FIGS. 5*a* and 5*b* are schematic presentations of a preferred apparatus 50 for a continuous production of corrugated element 10. The simplified construction of FIG. 5*a* comprises two parallel rolls 52 and 53 of wooden web placed in the first end of apparatus 50, the unwinded ends of webs W1 and W2 extending towards the by an arrow 56 pointed pressing section. FIG. 5*b* is a top view of the same, and shows an additional wood material web W3 unwinded from roll 54 and extending perpendicularly towards the path of said webs W1 and W2. The pathway of web W3 is provided with means 58 for applying the adhesive to both sides of said web W3, where after said web W3 is placed between webs W1 and W2 and all the webs are cut by suitable cutter means 59 provided in both paths of webs. Thus a pile of wooden sheets can be easily formed from web-like material unwinded from the web material rolls.

It should be noted that the arrangement 50 can comprise more than three web rolls and that it is also possible to provide several layers of web from the same roll. It should also be clear that the sheets can be of several various thicknesses. It is also obvious to the man skilled in the art that in most cases suitable guiding means are provided to draw and to locate the webs and sheets prior to the moulding. Even though the moulding means are not shown, it is also clear that they can be arranged in position as designated by arrow 56 or they can be placed after the cutting and piling station in position, where the element 10 is shown in FIGS. 5*a* and 5*b*.

In one alternative embodiment the apparatus is provided with means for turning a sheet (and thus the grains of the sheet) in a desired position, for instance with suitable manipulator means or an industrial robot, before placing said sheet on top of previous layer of sheets. In this case said sheet can be cut from a continuously extending web, and the apparatus can be provided with only one web roll.

Figure 6A:
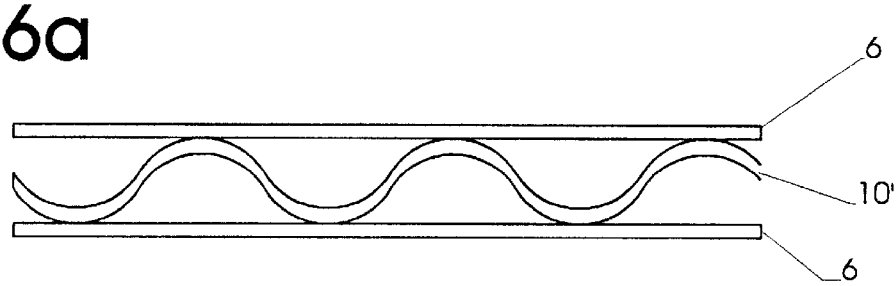
FIGS. 6a, 6b, 6c and 6d are showing, in schematic form, examples of various applications utilizing the structure according to the present invention.

FIG. 6*a* shows a cross-section through a light-weight building board which has flat external boards 6 and an undulating board 10' arranged intermediate said external boards. It is also possible to combine said board 10' with only one external board 6, thus providing an element having one planar and one undulating surface.

Figure 6B:
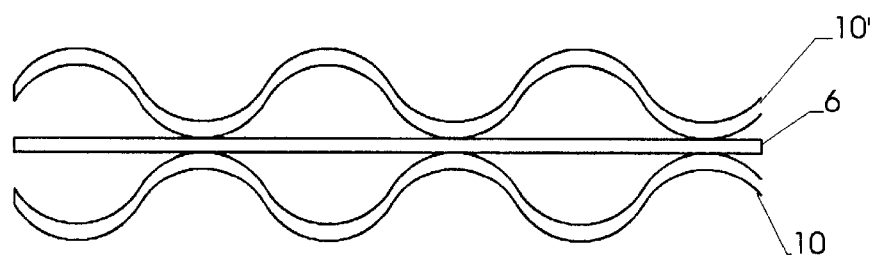

The version shown in FIG. 6*b* has a flat interior board 6 which in the area of its external boundary surfaces has an undulating board 10'. In the version shown in FIG. 6*b*, the undulating boards 10' are arranged relatively to each other in such a way that the internal board forms a plane of symmetry. The other or both of the outer surfaces can be provided with planar sheets as well.

Figure 6C:
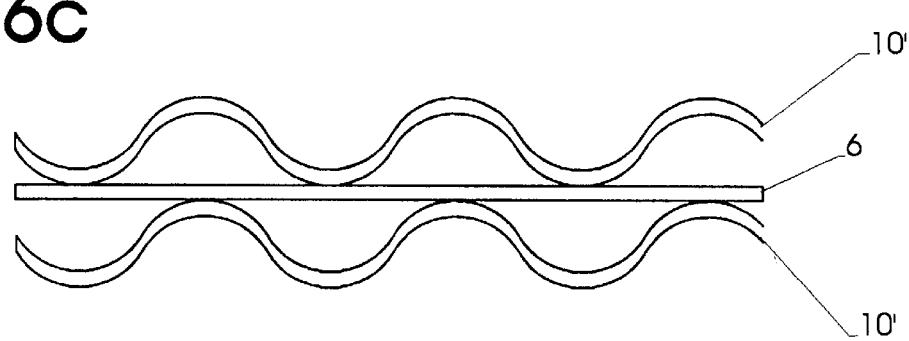

In the version shown in FIG. 6*c*, the misalignment of the undulating boards 10' in relation to each other is such that, as regards a transverse direction, there is a misaligned, but otherwise identical, geometry of the undulating boards. However, it is generally possible, depending on the respective application requirements, to arrange the undulating boards relative to each other in any way desired.

Figure 6D:
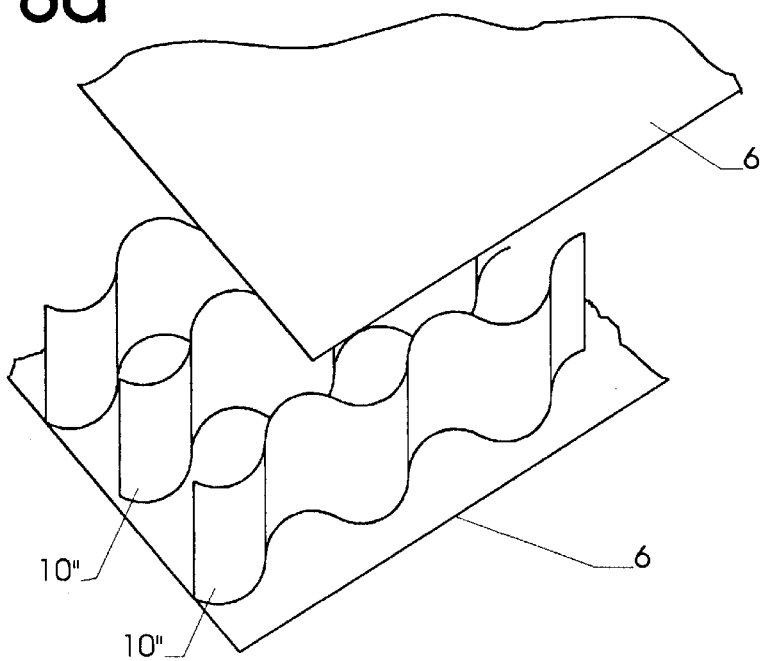

FIG. 6*d* shows a further use of the component according to the present invention. The undulating component is cut on to slices 10" of desired height and placed perpendicularly between two external sheets 6, i.e. such that the cut ends of the slices of component face the external sheet or sheets.

Said external sheet 6, as well as the boards of above mentioned elements can be of any suitable material, such as wood, metal, plastic, stone or the like. The undulating elements can be fixed on to the external sheet by suitable means like gluing or by nails or screws. A very rigid element for various kinds of applications can be achieved by this type of construction.

It should be noted that various elements disclosed in FIGS. 6*a* to *d* can also be combined such that elements described are placed one on top of another and also such that the elements placed on top of each other are not identical, but of different construction, by with various desired properties of complete construction elements can be achieved. It is also possible to combine two or several components on top of another such that the corrugations of adjacent components are extending perpendicular to each other.

Figure 7A:
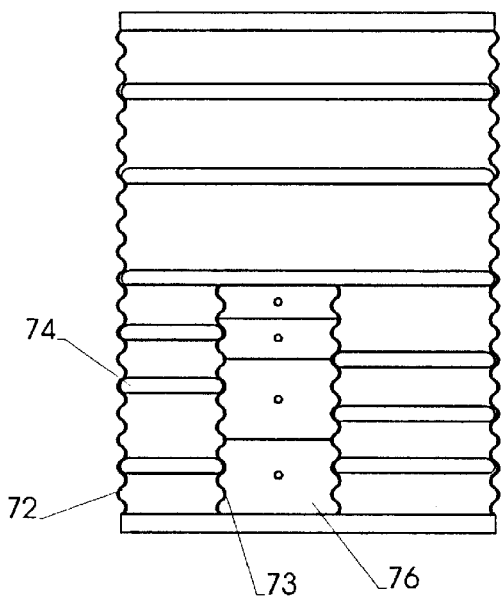
FIGS. 7a and 7b are showing one possible use and a detail of the processing of the corrugated element according to the present invention.

In FIG. 7 illustrates one possibility to utilize the invention in connection with furniture. A shelving system 70 comprises sidewalls 72 and intermediate wall 73, which are formed of components according to the present invention, shelves 74, the height and number of which can be freely chosen and drawer boxes 76, said boxes having preferably sidewalls made of a component matching to the undulation of the sidewalls.

Figure 7B:
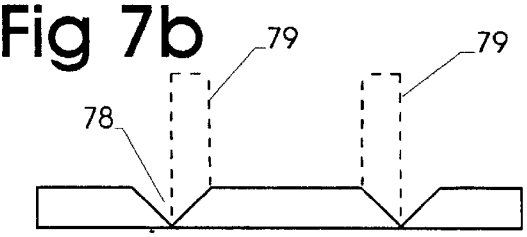

According to one preferred use of material, especially when producing furniture, the element is processed as shown in FIG. 7*b*. The element is cut such, that a V-shaped portion 78 is removed, said portion having preferably an angle of v of 90°, and there after said element is bent to form a cornered element as shown by dashed lines 79. By forming two corners and gluing or by other means bonding said corners a very rigid U-shaped element is provided, which can be used, for instance, as a base for shelving system shown in FIG. 7*a*. It is also possible to form a extremely rigid component having a continuous periphery, i.e., for example a rectangular or square element formed by the manner shown in FIG. 7b.

In generally terms, the production sequence is such that the bonding agent is initially applied to the other face or both faces of the wood layers 1 and/or 2. The deformation into an undulating shape is carried out with the aid of moulding elements 42 and 44 before the bonding agent 3 hardens. As a result, the wood layers can move relatively to each other and can compensate for differing bending radii to avoid material stresses. Thus, after deformation there are virtually no stresses in the material, so that constructions made from the light-weight building boards possess an extremely durable stability of form.

Figure 8A:
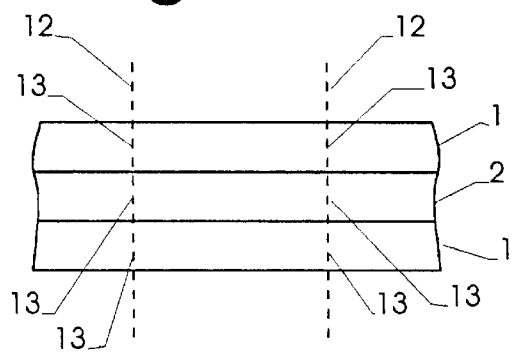
FIGS. 8a and 8b are a cross-section through three wood layers arranged together with marking lines before and after the production of the undulating structure to illustrate the relative movement of the wood layers.
Figure 8B:
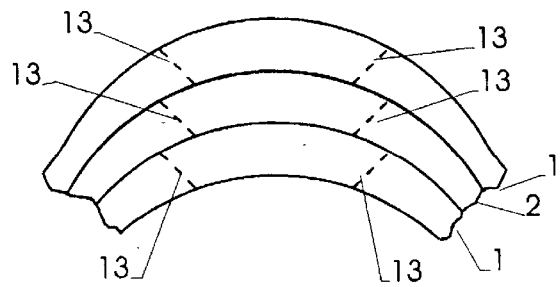

To further illustrate the production process, FIG. 8a shows three wood layers 1, 2 arranged together each with marking lines 12. The marking lines 12 consist of marking segments assigned to each wooden layer. These are arranged behind each other before the wood layers are deformed into an undulating shape 1, as shown in FIG. 8b. After the deformation into an undulating shape, during which a relative movement of the wood layers 1 and 2 to each other has taken place to compensate for the difference bending radii, the marking elements 13 are no longer arranged behind each other; instead there is a misalignment. This misalignment is made possible by the fact that the wood layers 1 and 2 are deformed into an undulating shape before the bonding agent hardens.

In a preferred starting arrangement, the moulding elements are positioned in such a way that the wood layers can be pushed between the moulding elements 42 and 44 in a flat orientation before being deformed into an undulating shape. After insertion of the wood layers, the moulding elements are moved towards each other. The result is that the wood layers are moulded into an undulating shape.

The moulding or pressing stage is preferably proceeded such that the moulding means 42 are moved in succession, i.e. one after another towards the counterpart 44. The moulding can be initiated intermediate the ends of the pile of sheets 10 or from the other end of the same.

Sometimes it is advantageous to spray water on the surfaces of the sheets. The element can also be heated after the moulding process but prior the moulding means are removed such that the hardening of the adhesive is enhanced and the moisture in the sheets is removed. In some cases it is also advantageous to "straighten" the edges of the moulded element by suitable cutting means.

The experiments have shown that the thickness of one ply can be varied from 0.15 mm to at least 1.6 mm thick sheets. However, even thicker sheets are believed to be suitable for the processings according to the present invention. The possible radiuses of undulation were found to start from 6 mm, a preferred radius being between 10 to 45 mm. It is believed that there is an relationship between the minimum radius obtainable and the thickness and quality of the wood-like sheets 1 and 2, such that the minimum radius can be obtained when using substantially thin sheets of wooden material. It is also preferred to have a wave length of about 5 cm or less to obtain a good rigidity. It should, however, be noted that these values are only results from the specific tests and it is believed that acceptable results are also available by other parameters and thus the scope of the invention is not limited to these values.

The foregoing discloses some preferred embodiments according to the invention but it is clear to those skilled in the art that the invention can be modified and applied in many other ways without departing from the spirit and scope of the present invention defined in the appended claims. For example, it should be understood that instead of using the simple device for the construction of the undulating boards shown in FIG. 4, it is generally also possible to use appropriate hardboards, between which the wood layers are inserted, in order to create precisely defined bending contours. With suitable contouring processes, any desired bending contours can be given to these hardboards.

What is claimed is:

1. A method for producing a corrugated construction element, said method comprising the steps of:

arranging at least three wood sheets in a pile, each said sheet having a grain and forming a layer in said pile, upper and lower external layers of said pile being aligned so that said grains thereof extend in generally parallel directions, and at least one inner core layer of said pile being aligned so that said grain thereof extends in a direction at an angle in a range from about 70° to about 120° to said direction of said grains in said external layers;

positioning said pile of wood sheets against a corrugated mold surface having a plurality of generally parallel, alternating ridges and grooves, said grains of said external layers being aligned generally parallel to said ridges and grooves of said mold surface and said grain of said core layer being aligned generally transverse to said ridges and grooves;

placing at least one flexible backing sheet between said pile and said mold surface;

pressing said pile against said corrugated mold surface so that said pile assumes a molded a shape which conforms thereto, said layers in said pile being free to move relative to one another so as to accommodate differing bending radii as said layers are pressed together and bent back-and-forth through curvatures in opposite directions over said alternating ridges and grooves of said surface;

holding said at least one flexible backing sheet under substantially constant tension so as to eliminate fracturing of said sheets of wood as said pile is pressed against said corrugated mold surface; and bonding said layers of said pile together after said pile has been pressed to said shape which conforms to said corrugated mold surface.

2. The method of claim 1, wherein the step of arranging said wood sheets in said pile comprises:

aligning said at least one core layer of said pile so that said grain thereof extends at an angle which is substantially perpendicular to said direction of said grains in said external layers.

3. The method of claim 1, wherein the step of arranging said wood sheets in said pile comprises:

arranging a plurality of said wood sheets between said external layers so as to form a plurality of core layers in said pile, said core layers being aligned so that said grains in said core layers extend alternately in said directions parallel to and at an angle to said direction of said grains of said external layers.

4. The method of claim 1, wherein the step of pressing said pile against said corrugated mold surface comprises:

initially applying pressure to said pile against said mold at a middle portion of said pile and then applying said pressure to said pile at positions progressing outwardly from said middle portion towards edge portions of said pile.

5. The method of claim 1, wherein the step of pressing said pile against said corrugated mold surface comprises:

initially applying pressure to said pile against said mold at a first edge of said pile and then applying said pressure to said pile at positions progressing from said first edge of said pile towards an opposite edge of said pile.

6. The method of claim 1, wherein the step of holding said at least one flexible backing sheet under tension comprises:

applying tension to said sheet between rollers at at least one edge of said sheet.

7. The method of claim 1, wherein the step of bonding said layers of said pile together comprises:

applying an adhesive to at least one surface of facing layers in said pile prior to pressing said pile against said mold surface, said adhesive remaining uncured while said layers are pressed together and bent so that said layers remain free to move relative to one another; and curing said adhesive so as to bond said layers after said pile has been pressed to said shape which conforms to said mold.

8. The method of claim 1, further comprising the step of:

applying moisture to said corrugated mold surface prior to pressing said pile against said surface.

9. The method of claim 1, wherein the step of arranging said wood sheets in said pile comprises:

unwinding a wood sheet from a first roll having an axis disposed in a first direction;

unwinding a wood sheet from a second roll having an axis in a plane parallel to said axis of said first roll and extending in a second direction which is substantially perpendicular to said first direction;

guiding said sheet from said first and second rolls so that said sheets extend across one another; and cutting said sheets form said rolls so as to form said pile of wood sheets.

10. The method of claim 1, further comprising the step of:

forming said wood sheets to have a thickness in the range from about 0.15 mm to about 1.6 mm.

11. The method of claim 10, further comprising the step of:

forming said alternating ridges and grooves on said corrugated mold surface to form radii of undulation in said corrugated element in a range from about 6 mm to about 45 mm.

12. The method of claim 10, further comprising the step of:

forming said alternating ridges and grooves on said corrugated mold surface to form a wave length in said corrugated element in a range less than about 5 cm.

* * * * *